United States Patent
Rothberg et al.

(10) Patent No.: US 7,945,727 B2
(45) Date of Patent: May 17, 2011

(54) DISK DRIVE REFRESHING ZONES IN SEGMENTS TO SUSTAIN TARGET THROUGHPUT OF HOST COMMANDS

(75) Inventors: Michael S. Rothberg, Foothill Ranch, CA (US); William B. Boyle, Lake Forest, CA (US); Chun Sei Tsai, Tustin, CA (US)

(73) Assignee: Western Digital Technologies, Inc., Irvine, CA (US)

(*) Notice: Subject to any disclaimer, the term of this patent is extended or adjusted under 35 U.S.C. 154(b) by 259 days.

(21) Appl. No.: 11/829,819

(22) Filed: Jul. 27, 2007

(65) Prior Publication Data

US 2009/0027799 A1  Jan. 29, 2009

(51) Int. Cl.
*G06F 12/00* (2006.01)

(52) U.S. Cl. .......... 711/112; 711/106; 711/167; 710/45; 710/58

(58) Field of Classification Search .......... 711/112
See application file for complete search history.

(56) References Cited

U.S. PATENT DOCUMENTS

| | | | |
|---|---|---|---|
| 4,642,715 A | 2/1987 | Ende | |
| 4,949,036 A | 8/1990 | Bezinque et al. | |
| 5,487,077 A | 1/1996 | Hassner et al. | |
| 5,508,869 A | 4/1996 | Nanjyo | |
| 5,600,500 A | 2/1997 | Madsen et al. | |
| 5,651,131 A * | 7/1997 | Chesley | 711/106 |
| 5,682,273 A | 10/1997 | Hetzler | |
| 5,781,518 A | 7/1998 | Yamagami et al. | |
| 5,784,296 A | 7/1998 | Baker et al. | |
| 5,870,237 A | 2/1999 | Emo et al. | |
| 5,872,800 A | 2/1999 | Glover et al. | |
| 5,873,114 A * | 2/1999 | Rahman et al. | 711/106 |
| 5,909,334 A | 6/1999 | Barr et al. | |
| 5,923,485 A | 7/1999 | Ito | |
| 5,930,358 A | 7/1999 | Rao | |
| 5,941,998 A | 8/1999 | Tillson | |
| 5,970,507 A * | 10/1999 | Kato et al. | 711/106 |
| 6,052,804 A | 4/2000 | Thowe et al. | |
| 6,181,500 B1 | 1/2001 | Serrano et al. | |
| 6,266,199 B1 | 7/2001 | Gillis et al. | |
| 6,289,484 B1 | 9/2001 | Rothberg et al. | |
| 6,317,813 B1 * | 11/2001 | Su et al. | 711/158 |
| 6,317,850 B1 | 11/2001 | Rothberg | |
| 6,327,106 B1 | 12/2001 | Rothberg | |
| 6,359,744 B1 | 3/2002 | Mallary | |
| 6,384,999 B1 | 5/2002 | Schibilla | |
| 6,393,511 B1 | 5/2002 | Albrecht et al. | |
| 6,426,909 B1 * | 7/2002 | Tomita | 365/222 |

(Continued)

FOREIGN PATENT DOCUMENTS

JP 10-255202 9/1998

*Primary Examiner* — Kevin L Ellis
*Assistant Examiner* — Kalpit Parikh (57) ABSTRACT

A disk drive is disclosed including a disk comprising a plurality of refresh zones, and a head actuated over the disk. The disk drive further comprises control circuitry for receiving access commands from a host. The control circuitry refreshes a refresh zone in a plurality of segments with an interval between each segment, and processes at least one of the access commands during the interval between at least two of the segments, wherein a size of each segment and the interval ensures an average throughput of access commands received from the host does not fall below a first threshold.

21 Claims, 8 Drawing Sheets

U.S. PATENT DOCUMENTS

| | | | |
|---|---|---|---|
| 6,429,984 B1 * | 8/2002 | Alex | 360/31 |
| 6,442,715 B1 | 8/2002 | Wilson | |
| 6,490,111 B1 | 12/2002 | Sacks | |
| 6,570,801 B2 * | 5/2003 | Yoshida et al. | 365/222 |
| 6,603,617 B1 | 8/2003 | Cross | |
| 6,606,211 B1 | 8/2003 | Lim et al. | |
| 6,628,466 B2 | 9/2003 | Alex | |
| 6,650,492 B2 | 11/2003 | Lenny et al. | |
| 6,661,597 B1 | 12/2003 | Codilian et al. | |
| 6,691,255 B1 | 2/2004 | Rothberg et al. | |
| 6,697,203 B1 | 2/2004 | Cheng et al. | |
| 6,697,992 B2 | 2/2004 | Ito et al. | |
| 6,714,368 B1 | 3/2004 | Himle et al. | |
| 6,747,827 B1 | 6/2004 | Bassett et al. | |
| 6,781,780 B1 | 8/2004 | Codilian | |
| 6,791,775 B2 | 9/2004 | Li et al. | |
| 6,798,591 B2 | 9/2004 | Barnett et al. | |
| 6,809,893 B2 | 10/2004 | Uzumaki et al. | |
| 6,826,007 B1 | 11/2004 | Patton, III | |
| 6,854,022 B1 | 2/2005 | Thelin | |
| 6,854,071 B2 | 2/2005 | King et al. | |
| 6,862,505 B2 | 3/2005 | Satoh et al. | |
| 6,892,249 B1 | 5/2005 | Codilian et al. | |
| 6,895,500 B1 | 5/2005 | Rothberg | |
| 6,898,033 B2 | 5/2005 | Weinstein et al. | |
| 6,947,234 B2 | 9/2005 | Lamberts et al. | |
| 6,948,102 B2 | 9/2005 | Smith | |
| 6,950,967 B1 | 9/2005 | Brunnett et al. | |
| 6,980,386 B2 | 12/2005 | Wach et al. | |
| 6,982,842 B2 | 1/2006 | Jing et al. | |
| 6,987,630 B1 | 1/2006 | Higgins et al. | |
| 6,995,933 B1 | 2/2006 | Codilian et al. | |
| 7,006,321 B2 | 2/2006 | Kisaka | |
| 7,024,614 B1 | 4/2006 | Thelin et al. | |
| 7,032,127 B1 | 4/2006 | Egan et al. | |
| 7,043,598 B2 | 5/2006 | Wu et al. | |
| 7,050,252 B1 | 5/2006 | Vallis | |
| 7,057,839 B2 | 6/2006 | Shikuma et al. | |
| 7,076,604 B1 | 7/2006 | Thelin | |
| 7,082,494 B1 | 7/2006 | Thelin et al. | |
| 7,120,737 B1 | 10/2006 | Thelin | |
| 7,143,203 B1 | 11/2006 | Altmejd | |
| 7,143,309 B2 | 11/2006 | Yoshida | |
| 7,173,782 B2 | 2/2007 | Ikeda et al. | |
| 7,177,979 B2 * | 2/2007 | Kuwamura | 711/112 |
| 7,345,837 B1 | 3/2008 | Schreck et al. | |
| 7,362,532 B2 | 4/2008 | Iwama | |
| 7,405,893 B2 | 7/2008 | Bi et al. | |
| 7,477,465 B2 | 1/2009 | Yu | |
| 7,599,139 B1 | 10/2009 | Bombet et al. | |
| 7,606,129 B2 | 10/2009 | Urata et al. | |
| 7,649,704 B1 | 1/2010 | Bombet et al. | |
| 7,872,822 B1 | 1/2011 | Rothberg | |
| 2001/0043424 A1 * | 11/2001 | Nguyen | 360/75 |
| 2003/0007269 A1 | 1/2003 | Alex | |
| 2003/0016461 A1 | 1/2003 | Seng et al. | |
| 2004/0153949 A1 | 8/2004 | Ro et al. | |
| 2004/0174627 A1 | 9/2004 | Kim et al. | |
| 2004/0252397 A1 | 12/2004 | Hodge et al. | |
| 2004/0264028 A1 | 12/2004 | Ishii et al. | |
| 2004/0268033 A1 | 12/2004 | Chia et al. | |
| 2005/0036437 A1 | 2/2005 | Learned et al. | |
| 2005/0063084 A1 | 3/2005 | Fujiwara et al. | |
| 2005/0078393 A1 | 4/2005 | Cho | |
| 2005/0146803 A1 | 7/2005 | Kim et al. | |
| 2005/0188153 A1 | 8/2005 | Yun et al. | |
| 2005/0207049 A1 | 9/2005 | Ikeda et al. | |
| 2006/0066971 A1 | 3/2006 | Alex et al. | |
| 2006/0098318 A1 | 5/2006 | Feng | |
| 2006/0101197 A1 | 5/2006 | Georgis et al. | |
| 2006/0132954 A1 | 6/2006 | Wada et al. | |
| 2006/0198041 A1 | 9/2006 | Kuwamura | |
| 2007/0076315 A1 | 4/2007 | McMurtrey | |
| 2007/0223124 A1 | 9/2007 | Amemiya | |
| 2007/0277011 A1 | 11/2007 | Tanaka et al. | |

* cited by examiner

DISK DRIVE REFRESHING ZONES IN SEGMENTS TO SUSTAIN TARGET THROUGHPUT OF HOST COMMANDS

BACKGROUND

1. Field

The present invention relates to disk drives for computer systems. In particular, the present invention relates to a disk drive refreshing zones in segments to sustain target throughput of host commands.

2. Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

Figure 1:
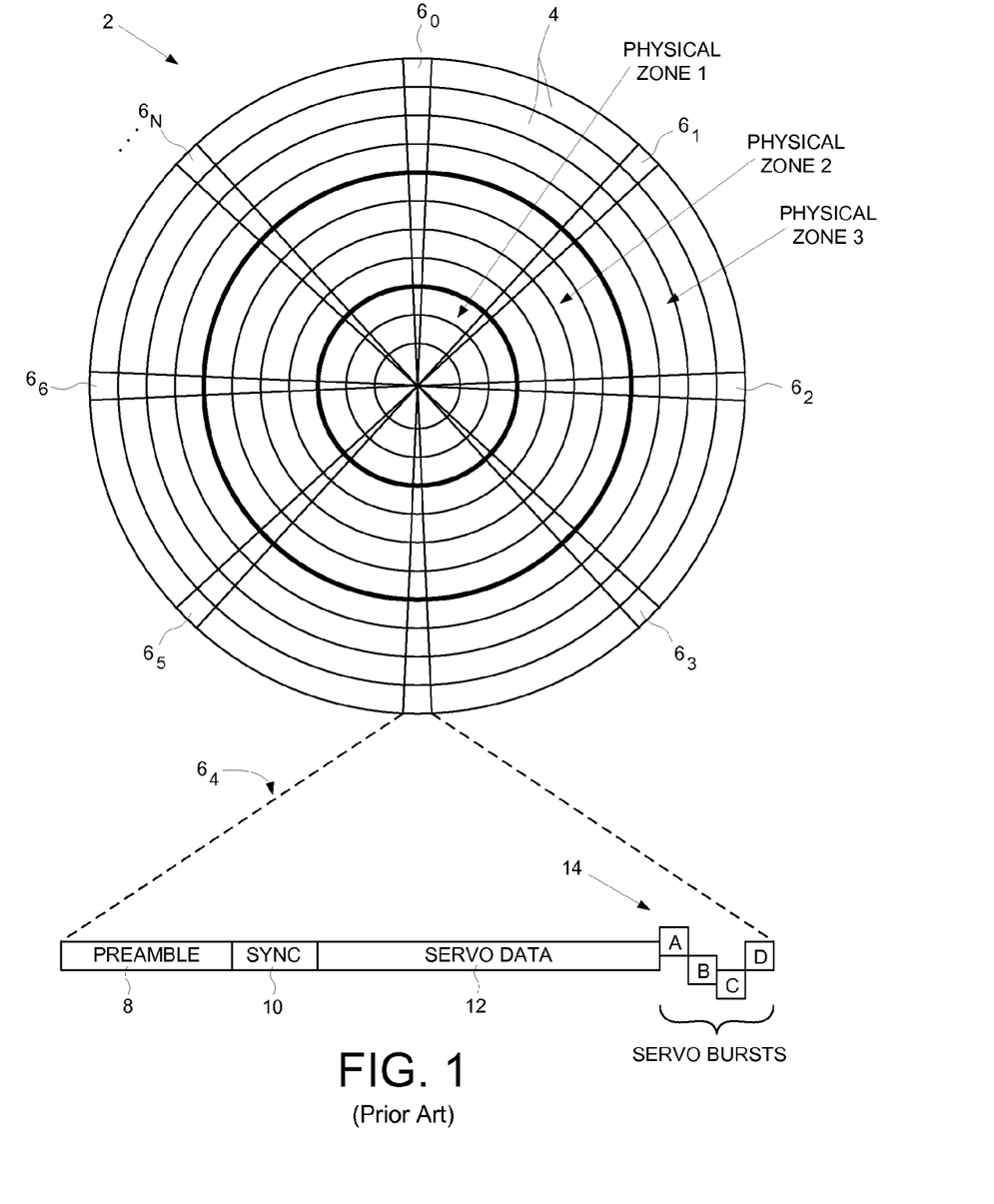
FIG. 1 shows a prior art disk format having a plurality of tracks banded together to form a plurality of physical zones.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of embedded servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The degrading effect of ATI on the adjacent tracks compounds over time with each write operation to the target track. Eventually, the magnetic field emanating from the disk surface will deteriorate to the point that the data is no longer recoverable.

Figure 2:
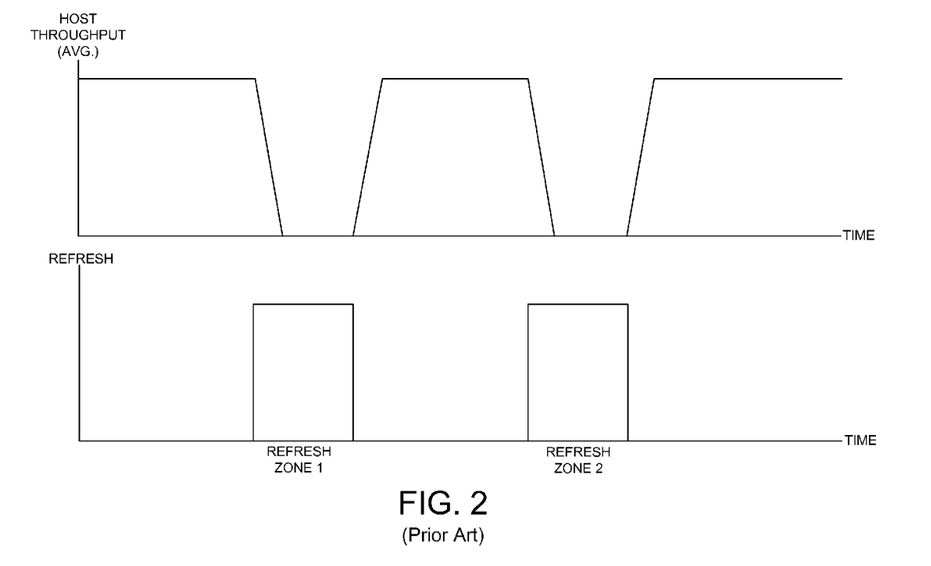
FIG. 2 illustrates how in the prior art the average throughput of access commands received from a host will fall to zero due to refreshing a refresh zone in one segment.

To protect against catastrophic data loss due to magnetic entropy, the prior art has suggested to maintain refresh monitors for periodically refreshing data within refresh zones (reading and rewriting data) so as to periodically realign the magnetic orientation of the grains. When a refresh monitor triggers, indicating that a refresh zone needs refreshing, the prior art refreshes the entire zone which can significantly reduce or even halt the average throughput of access commands received from the host until the refresh operation is completed as illustrated in FIG. 2.

There is, therefore, a need to perform a refresh operation for a disk drive while maintaining adequate throughput of host commands.

SUMMARY OF THE EMBODIMENTS OF THE INVENTION

An embodiment of the present invention comprises a disk drive including a disk comprising a plurality of refresh zones, and a head actuated over the disk. The disk drive further comprises control circuitry for receiving access commands from a host. The control circuitry refreshes a refresh zone in a plurality of segments with an interval between each segment, and processes at least one of the access commands during the interval between at least two of the segments, wherein a size of each segment and the interval ensures an average throughput of access commands received from the host does not fall below a first threshold.

In one embodiment, at least one of the refresh zones comprises a plurality of tracks.

In another embodiment, the tracks form a plurality of physical zones, and the segment size is selected relative to the physical zones. In one embodiment, each track comprises a plurality of data sectors, and the segment size is selected relative to a number of data sectors per track within each physical zone. In another embodiment, each track comprises a plurality of data sectors, a number of skew data sectors is associated with a contiguous access pattern when switching tracks within one of the physical zones, and the segment size is selected relative to the number of skew data sectors.

In yet another embodiment, the control circuitry maintains a first priority queue of refresh zones scheduled to be refreshed using a first interval between segments, and maintains a second priority queue of refresh zones scheduled to be refreshed using a second interval between segments, wherein the second interval is shorter than the first interval. In one embodiment, a duration of the first interval ensures an average throughput of access commands received from the host does not fall below the first threshold, and a duration of the second interval ensures an average throughput of access commands received from the host does not fall below a second threshold less than the first threshold. In another embodiment, the control circuitry maintains a refresh monitor for each refresh zone, and transfers one of the refresh zones held in the first priority queue to the second priority queue if the corresponding refresh monitor exceeds a threshold.

In still another embodiment, the control circuitry adjusts the interval, and in one embodiment, the control circuitry maintains a command queue of access commands received from the host and adjusts the interval based on a number of access commands in the command queue. In another embodiment, the control circuitry maintains a refresh queue of refresh zones scheduled to be refreshed and adjusts the interval based on a number of refresh zones in the refresh queue.

Another embodiment of the present invention comprises a method of operating a disk drive, the disk drive as comprising a disk including a plurality of refresh zones, and a head actuated over the disk. Access commands are received from a host, and a refresh zone is refreshed in a plurality of segments with an interval between each segment, wherein at least one access command is processed during the interval between at least two of the segments, and a size of each segment and the interval ensures an average throughput of access commands received from the host does not fall below a first threshold.

DETAILED DESCRIPTION OF EMBODIMENTS OF THE INVENTION

Figure 3A:
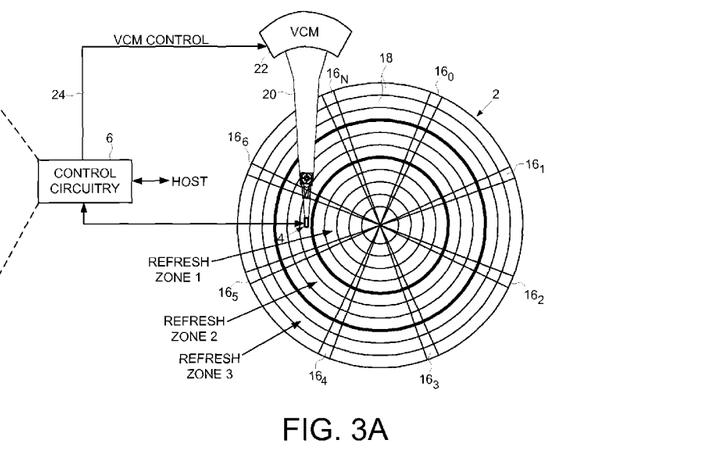
FIG. 3A shows a disk drive according to an embodiment of the present invention comprising a disk, a head actuated over the disk, and control circuitry.
Figure 3B:
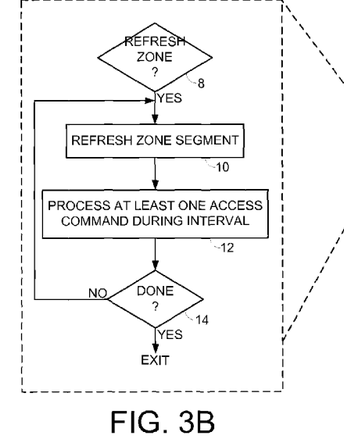
FIG. 3B is a flow diagram executed by the control circuitry according to an embodiment of the present invention for refreshing a refresh zone in segments to ensure an average throughput of access commands received from the host does not fall below a first threshold.

FIG. 3A shows a disk drive according to an embodiment of the present invention including a disk 2 having a plurality of refresh zones (e.g., refresh zones 1-3), and a head 4 actuated over the disk 2. The disk drive further comprises control circuitry 6 for receiving access commands from a host. The control circuitry 6 executes the flow diagram of FIG. 3B according to an embodiment of the present invention. When a refresh zone needs refreshing (step 8), the control circuitry 6 refreshes the refresh zone in a plurality of segments (step 10) with an interval between each segment, and processes at least one of the access commands during the interval between at least two of the segments (step 12), wherein a size of each segment and the interval ensures an average throughput of access commands received from the host does not fall below a first threshold. The refresh operation continues until all of the segments of the refresh zone have been refreshed (step 14).

In the embodiment of FIG. 3A, the disk 2 comprises a plurality of embedded servo sectors $16_0$-$16_N$ that define a plurality of data tracks 18. The head 4 is connected to a distal end of an actuator arm 20 which is rotated about a pivot by a voice coil motor (VCM) 22 in order to actuate the head 4 radially over the disk 2. The control circuitry 6 processes the read signal emanating from the head 4 to demodulate the information in the embedded servo sectors. The demodulated servo information (position error signal) is then processed (e.g., using appropriate compensation filtering) to generate a position control signal 24 applied to the VCM 22 in order to position the head 4 over a target data track (seek to the target data track and track the centerline of the target data track). In one embodiment, each data track is partitioned into a number of data sectors, wherein write/read operations are performed on one or more data sectors at a time.

In the embodiment of FIG. 3A the data tracks 18 are banded together into a plurality of refresh zones from the inner to outer diameter of the disk. However, the refresh zones may be defined in any suitable manner, including to define the refresh zone relative to logical block addresses or physical block addresses. In one embodiment, the refresh zones may extend across multiple disk surfaces.

Figure 4A:
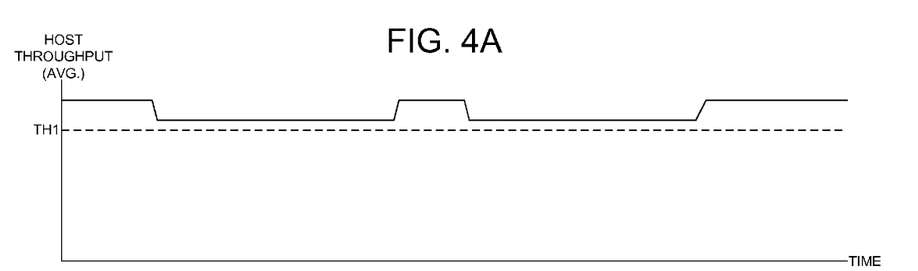
FIGS. 4A and 4B illustrate how refreshing a refresh zone in segments with an interval between each segment ensures an average throughput of access commands received from the host does not fall below a first threshold.
Figure 4B:
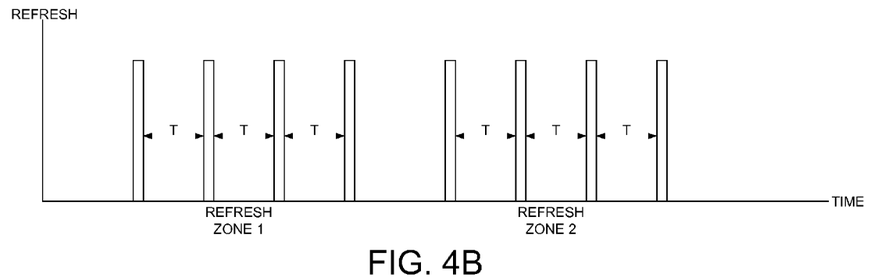

FIGS. 4A and 4B illustrate how refreshing a refresh zone in segments with an interval between each segment ensures an average throughput of access commands received from the host does not fall below a first threshold TH1. The average throughput may be measured in any suitable manner, such as the number of access commands received per second. In FIG. 4A the y-axis represents the average throughput of host commands, and the x-axis represents time. In FIG. 4B, the y-axis represents an amount of data (segment size) that is refreshed between an interval T, and the x-axis represents time, wherein any suitable threshold TH1 and any suitable corresponding segment size and interval T may be selected in the embodiments of the present invention. For example, the threshold TH1 may be selected for a family of disk drives, or it may be configured in-the-field relative to the needs of a particular user or a particular operating environment. In an embodiment described below, the segment size and/or interval are adjustable relative to an operating parameter of the disk drive, such as the number of access commands in a command queue or a number of refresh zones queued for refreshing.

In one embodiment, the tracks form a plurality of physical zones similar to the prior art disk format shown in FIG. 1, wherein the physical zones may be the same or different than the refresh zones. A data rate of data recorded in the data sectors may be increased from the inner diameter physical zone to the outer diameter physical zone in order to maintain a more constant linear bit recording density. In one embodiment, the segment size is selected relative the physical zones, for example, by selecting the segment size relative to a number of data sectors per track within each physical zone. In another embodiment, a number of skew data sectors is associated with a contiguous access pattern when switching tracks within one of the physical zones, and the segment size is selected relative to a number of data sectors per track and the number of skew data sectors within each physical zone.

Figure 5:
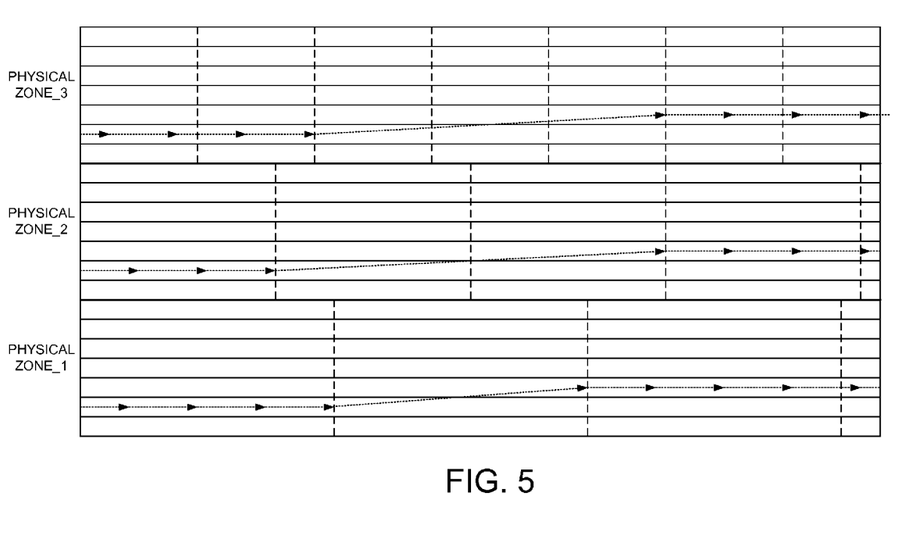
FIG. 5 illustrates an embodiment of the present invention wherein the segment size is selected relative to a number of data sectors per track and a number of skew data sectors within each physical zone.

An example of the number of skew data sectors per physical zone is illustrated in FIG. 5 which shows that when switching tracks there may be one skew data sector for physical zone one, two skew data sectors for physical zone two, and three skew data sectors for physical zone three. In practice, there may be significantly more skew data sectors per physical zone, and in one embodiment, they may be measured by a number of wedges (e.g., the number of data sectors between consecutive servo sectors 16). Since switching tracks consumes time, in one embodiment the segment size is reduced by the switching latency. For example, in one embodiment the segment size is selected as 2×(data_sectors_per_track)−2.5× (skew_data_sectors). So if a particular physical zone comprises 100 data sectors per track and 10 skew data sectors, the segment size would equal 2×(100)−2.5×(10)=175 data sectors. In one embodiment, once the segment size is selected, the interval T may be selected for the segment size. The selected segment size and interval T may result in a threshold TH1, i.e., a segment size and an interval that will ensure the average throughput of access commands received from the host does not fall below the first threshold TH1. In another embodiment, once the interval T is selected, the segment size may be selected relative to the interval T. The interval T and/or segment size may be fixed for a class of disk drives or may be adjusted based on disk drive operating conditions, as will be described more fully below.

Figure 6:
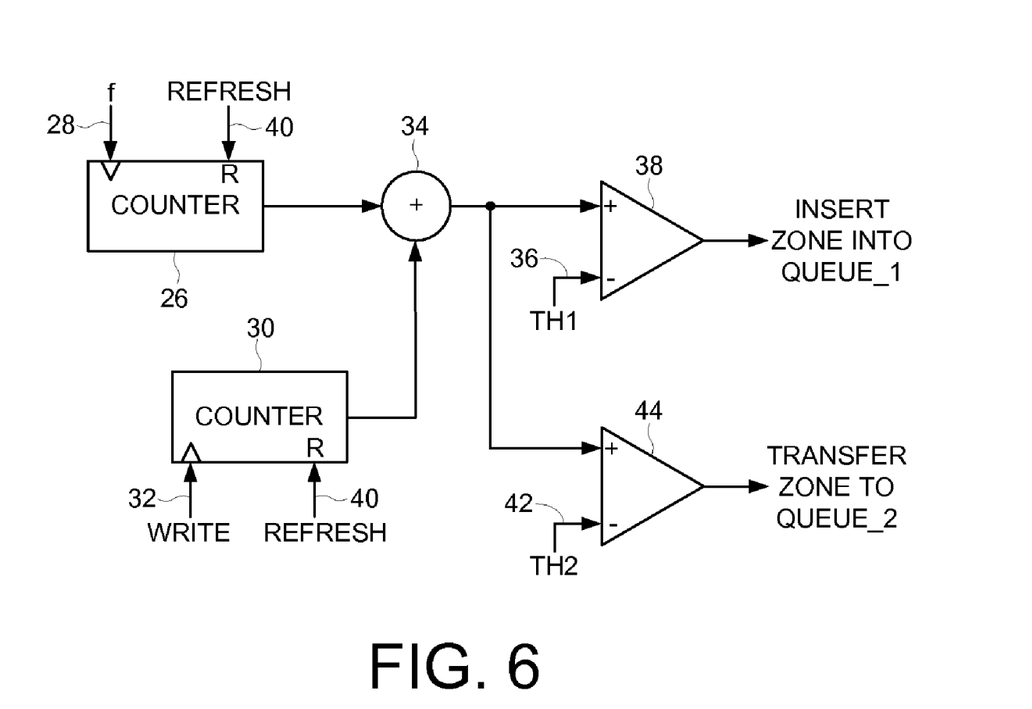
FIG. 6 shows a refresh monitor according to an embodiment of the present invention wherein a refresh zone is inserted into a first priority queue and transferred to a higher priority queue if the refresh monitor indicates an exigent need to refresh.

Any suitable refresh monitor may be employed in the embodiments of the present invention to determine when a refresh zone needs to be refreshed. FIG. 6 shows an example refresh monitor that may be implemented by the control circuitry 6, comprising a first counter 26 clocked at a frequency 28 that establishes a refresh interval, and a second counter 30 clocked by a write signal 32 each time a write operation is performed to the refresh zone. Thus, the refresh monitor of FIG. 6 can be considered as tracking a refresh interval that is biased by the number of writes to the refresh zone to compensate for the precipitating effect that write operations have on magnetic entropy. The output of counter 26 is combined with the output of counter 30 at adder 34, and when the output of adder 34 exceeds a first threshold 36 at comparator 38, the corresponding refresh zone may be inserted into a first queue having a first priority. Once the refresh zone is selected from the first queue and refreshed, the counters 26 and 30 may be reset by a refresh signal 40. However, if the output of adder 34 exceeds a second threshold 42 at comparator 44 before the refresh zone is refreshed, then the refresh zone may be transferred from the first queue to a second queue having a higher priority in order to expedite the refresh operation for that refresh zone. That is, the refresh zones stored in the second queue may be refreshed prior to the refresh zones stored in the first queue.

Figure 7A:
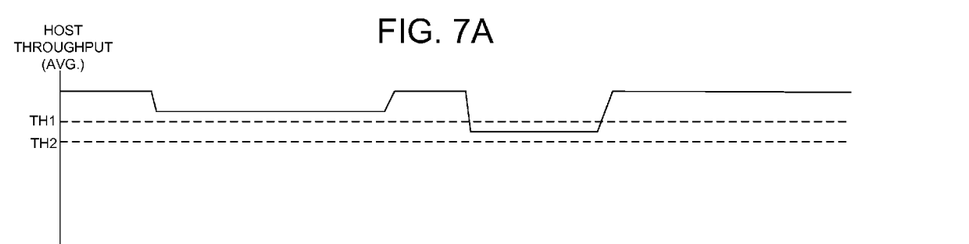
FIGS. 7A and 7B show an embodiment of the present invention wherein a smaller interval is used to refresh zones in the higher priority queue to expedite the refresh process.
Figure 7B:
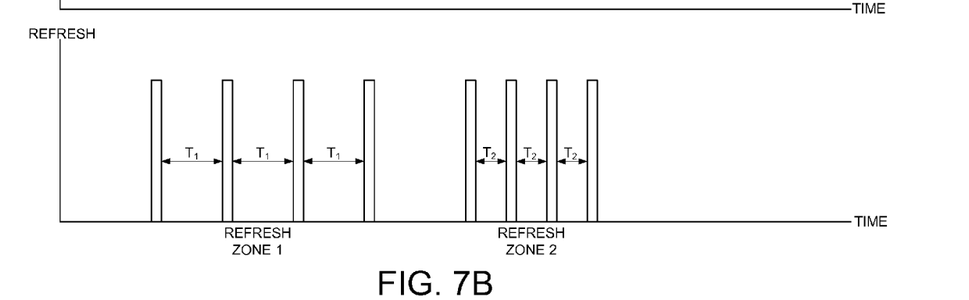

In one embodiment, the control circuitry 6 maintains a first priority queue of refresh zones scheduled to be refreshed using a first interval between segments, and maintains a second priority queue of refresh zones scheduled to be refreshed using a second interval between segments, wherein the second interval is shorter than the first interval. In one embodiment, a duration of the first interval ensures an average throughput of access commands received from the host does not fall below the first threshold, and a duration of the second interval ensures an average throughput of access commands received from the host does not fall below a second threshold less than the first threshold. This embodiment is illustrated in FIGS. 7A and 7B wherein a first refresh zone (ZONE 1) is selected from the first priority queue and refreshed at a first refresh interval $T_1$ that prevents the average throughput of access commands received from the host from falling below a first threshold TH1. While refreshing the first refresh zone (ZONE 1) a second refresh zone (ZONE 2) is transferred from the first priority queue to the second priority queue. The second refresh zone is then selected from the second priority queue and refreshed at a second interval $T_2$ that prevents the average throughput of access commands received from the host from falling below a second threshold TH2. Decreasing the interval from $T_1$ to $T_2$ helps ensure that the refresh zones approaching their refresh limit are refreshed in a timely manner at the expense of reducing the average throughput of access commands received from the host.

Figure 8A:
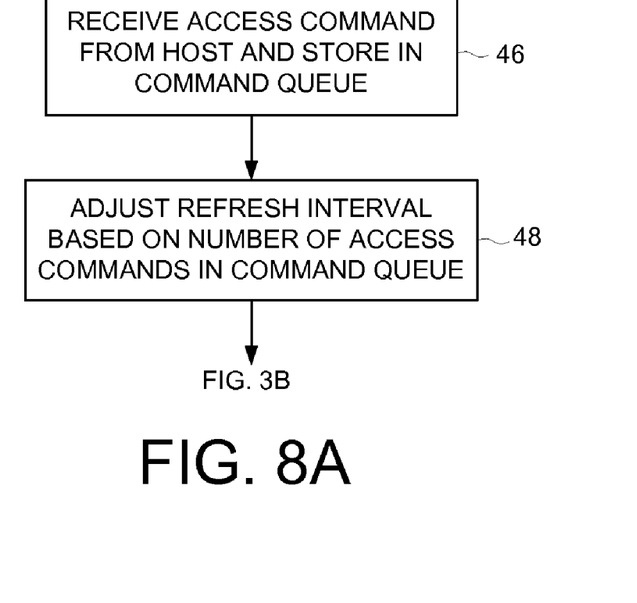
FIG. 8A is a flow diagram according to an embodiment of the present invention wherein the interval between segments of a refresh zone is adjusted relative to a number of access commands in a command queue.

In one embodiment, the control circuitry 6 may adjust the refresh interval and/or the segment size using any suitable criteria. FIG. 8A shows a flow diagram that may be executed by the control circuitry 6 wherein the access commands received from the host are stored in a command queue (step 46), and then the interval (and/or segment size) is adjusted based on a number of access commands in the command queue (step 48). For example, the interval may be increased as more access commands are queued in the command queue to help sustain the desired throughput of access commands. As the number of access commands in the command queue decreases, the interval may be decreased to help expedite the refresh of the queued refresh zones. Adjusting the interval and/or segment size may also alter the threshold TH1 (FIG. 4A), such that, for example, a shorter interval may result in the threshold TH1 decreasing due to less access commands being processed.

Figure 8B:
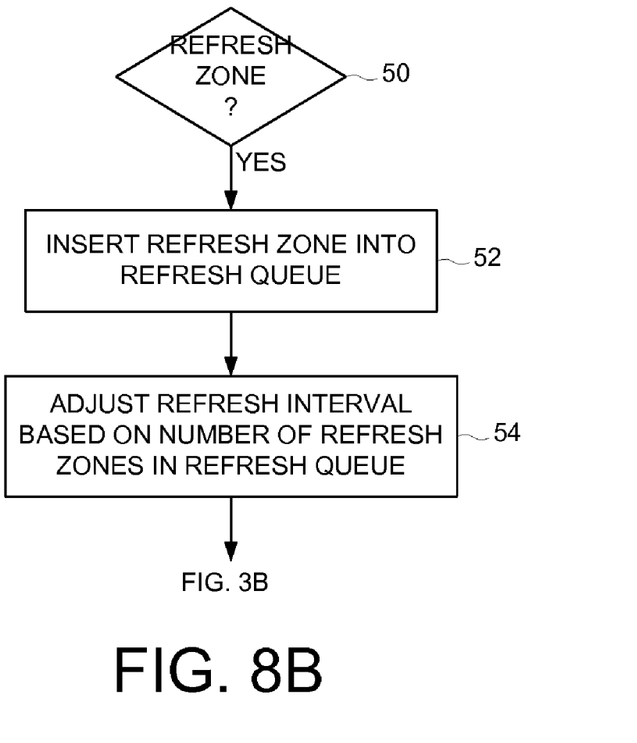
FIG. 8B is a flow diagram according to an embodiment of the present invention wherein the interval between segments of a refresh zone is adjusted relative to a number of refresh zones in a refresh queue.

FIG. 8B shows a flow diagram that may be executed by the control circuitry 6 according to another embodiment wherein a refresh zone needing to be refreshed (step 50) is inserted into a refresh queue (step 52), and the control circuitry 6 adjusts the interval between segments based on the number of refresh zones queued in the refresh queue (step 54). For example, the interval may be decreased as the number of refresh zones queued for refreshing increases to ensure that the refresh zones are processed in a timely manner. As described above, modifying the interval may decrease or increase the threshold TH1 (FIG. 4A).

In another embodiment of the present invention, the refresh operation for a refresh zone may be canceled or deferred based on any suitable criteria, such as the number of access commands in the command queue. In one embodiment, the refresh operation is restarted from the beginning of the refresh zone after being canceled, and in another embodiment, the refresh operation is restarted at the segment where the refresh operation stopped (i.e., the refresh operation is deferred). In yet another embodiment, the current segment being refreshed is finished before deferring the refresh operation, the interval following the segment is extended until enough access commands have been processed, and then the refresh operation continues. Accordingly, in one embodiment the interval may be adjusted for each segment within a single refresh zone based on any suitable criteria, such as the number of access commands in the command queue. For example, if the interval were decreased for each segment in the refresh zone, this may result in a host average throughput curve that has a downward slope instead of the horizontal line shown in FIG. 4A. This may result in a threshold TH1 that is at the bottom of the sloped host average throughput curve.

Any suitable control circuitry 6 may be employed in the embodiments of the present invention, such as any suitable integrated circuit or circuits. For example, the control circuitry 6 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 6 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry 6 comprises suitable logic circuitry, such as state machine circuitry.

What is claimed is:

1. A disk drive comprising:
   a disk comprising a plurality of refresh zones including a first refresh zone and a second refresh zone, wherein:
      the first refresh zone comprises a plurality of tracks including a first track;
      the second refresh zone comprises a plurality of tracks including a second track; and
      a data rate of the second track is greater than a data rate of the first track;
   a head actuated over the disk; and
   control circuitry operable to:
      receive access commands from a host;
      refresh the first refresh zone in a first plurality of segments having a first segment size, wherein the first plurality of segments are refreshed with a first interval between each segment;
      refresh the second refresh zone in a second plurality of segments having a second segment size, wherein the second plurality of segments are refreshed with a second interval between each segment; and
      process at least one of the access commands during the first and second intervals;
      wherein the first segment size is different from the second segment size.

2. The disk drive as recited in claim 1, wherein:
   the first track comprises a first number of data sectors; and
   the first segment size is based on the first number of data sectors.

3. The disk drive as recited in claim 1, wherein:
   the first track comprises a plurality first number of data sectors;
   a first number of skew data sectors is associated with a contiguous access pattern when switching tracks within the first refresh zone; and
   the first segment size is based on the first number of skew data sectors.

4. The disk drive as recited in claim 1, wherein:
   the first track comprises a first number of data sectors;
   a first number of skew data sectors is associated with a contiguous access pattern when switching tracks within the first refresh zone; and
   the first segment size is based on the first number of data sectors per track and the first number of skew data sectors.

5. The disk drive as recited in claim 1, wherein the control circuitry is further operable to:
   maintain a first priority queue of refresh zones scheduled to be refreshed using a first interval between each segment; and
   maintain a second priority queue of refresh zones scheduled to be refreshed using a second interval between each segment, wherein the second interval is shorter than the first interval.

6. The disk drive as recited in claim 5, wherein:
   a duration of the first interval ensures an average throughput of access commands received from the host does not fall below a first threshold; and
   a duration of the second interval ensures an average throughput of access commands received from the host does not fall below a second threshold less than the first threshold.

7. The disk drive as recited in claim 5, wherein the control circuitry is further operable to:
   maintain a refresh monitor for each refresh zone; and
   transfer one of the refresh zones held in the first priority queue to the second priority queue if the corresponding refresh monitor exceeds a second threshold.

8. The disk drive as recited in claim 1, wherein the control circuitry is further operable to adjust at least one of the first and second intervals.

9. The disk drive as recited in claim 8, wherein the control circuitry is further operable to:
   maintain a command queue of access commands received from the host; and
   adjust at least one of the first and second intervals based on a number of access commands in the command queue.

10. The disk drive as recited in claim 8, wherein the control circuitry is further operable to:
    maintain a refresh queue of refresh zones scheduled to be refreshed; and
    adjust at least one of the first and second intervals based on a number of refresh zones in the refresh queue.

11. A method of operating a disk drive, the disk drive comprising a head actuated over a disk, the disk comprising a plurality of refresh zones including a first refresh zone and a second refresh zone, wherein:
    the first refresh zone comprises a plurality of tracks including a first track;
    the second refresh zone comprises a plurality of tracks including a second track; and
    a data rate of the second track is greater than a data rate of the first track;
    the method comprising:
       receiving access commands from a host;
       refreshing the first refresh zone in a first plurality of segments having a first segment size, wherein the first plurality of segments are refreshed with a first interval between each segment;
       refreshing the second refresh zone in a second plurality of segments having a second segment size, wherein the second plurality of segments are refreshed with a second interval between each segment; and
       processing at least one of the access commands during the first and second intervals;
       wherein the first segment size is different from the second segment size.

12. The method as recited in claim 11, wherein:
    the first track comprises a first number of data sectors; and the first segment size is based on the first number of data sectors.

13. The method as recited in claim 11, wherein:
the first track comprises a first number of data sectors;
a first number of skew data sectors is associated with a contiguous access pattern when switching tracks within the first refresh zone; and
the first segment size is based on the first number of skew data sectors.

14. The method as recited in claim 11, wherein:
the first track comprises a first number of data sectors;
a first number of skew data sectors is associated with a contiguous access pattern when switching tracks within the first refresh zone; and
the first segment size is based on the first number of data sectors per track and the first number of skew data sectors.

15. The method as recited in claim 11, further comprising:
maintaining a first priority queue of refresh zones scheduled to be refreshed using a first interval between each segment; and
maintaining a second priority queue of refresh zones scheduled to be refreshed using a second interval between each segment, wherein the second interval is shorter than the first interval.

16. The method as recited in claim 15, wherein:
a duration of the first interval ensures an average throughput of access commands received from the host does not fall below a first threshold; and
a duration of the second interval ensures an average throughput of access commands received from the host does not fall below a second threshold less than the first threshold.

17. The method as recited in claim 15, further comprising:
maintaining a refresh monitor for each refresh zone; and
transferring one of the refresh zones held in the first priority queue to the second priority queue if the corresponding refresh monitor exceeds a threshold.

18. The method as recited in claim 11, further comprising adjusting at least one of the first and second intervals.

19. The method as recited in claim 18, further comprising
maintaining a command queue of access commands received from the host; and
adjusting at least one of the first and second intervals based on a number of access commands in the command queue.

20. The method as recited in claim 18, further comprising:
maintaining a refresh queue of refresh zones scheduled to be refreshed; and
adjusting at least one of the first and second intervals based on a number of refresh zones in the refresh queue.

21. A disk drive as comprising:
a disk comprising a plurality of refresh zones including a first refresh zone and a second refresh zone, wherein:
the first refresh zone comprises a plurality of tracks including a first track;
the second refresh zone comprises a plurality of tracks including a second track; and
a data rate of the second track is greater than a data rate of the first track;
a head actuated over the disk;
a means for receiving access commands from a host;
a means for refreshing the first refresh zone in a first plurality of segments having a first segment size, wherein the first plurality of segments are refreshed with a first interval between each segment;
a means for refreshing the second refresh zone in a second plurality of segments having a second segment size, wherein the second plurality of segments are refreshed with a second interval between each segment;
a means for processing at least one of the access commands during the first and second intervals; and
wherein the first segment size is different from the second segment size.

* * * * *